US008745728B2

(12) United States Patent
Umamaheswaran et al.

(10) Patent No.: US 8,745,728 B2
(45) Date of Patent: *Jun. 3, 2014

(54) CREATING FEDERATED ASSOCIATE IDENTIFIERS TO POSITIVELY IDENTIFY ASSOCIATES INTERFACING ACROSS MULTIPLE BUSINESS APPLICATIONS

(75) Inventors: Rangarajan Umamaheswaran, Simi Valley, CA (US); Bruce Wyatt Englar, Ventura, CA (US); Brett A. Nielson, Spangle, WA (US); Miroslav Halas, Charlottesville, VA (US)

(73) Assignee: Bank of America Corporation, Charlotte, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/468,813

(22) Filed: May 10, 2012

(65) Prior Publication Data
US 2013/0305317 A1 Nov. 14, 2013

(51) Int. Cl.
*G06Q 30/02* (2012.01)
*H04L 29/06* (2006.01)

(52) U.S. Cl.
CPC .................................. *H04L 63/0815* (2013.01)
USPC ............. 726/19; 726/4; 726/5; 726/6; 726/8; 705/14.25; 705/14.53; 705/14.66; 705/44; 705/325; 707/607; 707/E17.089; 707/E17.059; 713/153; 713/182; 709/217; 709/229

(58) Field of Classification Search
CPC .. G06Q 30/0269; H04L 67/306; H04L 67/22; H04L 63/0815; H04N 21/42684
See application file for complete search history.

(56) References Cited

U.S. PATENT DOCUMENTS

| 6,839,680 | B1 * | 1/2005 | Liu et al. ....................... 705/7.33 |
|---|---|---|---|
| 7,676,829 | B1 * | 3/2010 | Gui et al. ........................... 726/5 |
| 7,680,819 | B1 * | 3/2010 | Mellmer et al. ............... 707/783 |
| 8,650,083 | B2 * | 2/2014 | Doughty et al. ........... 705/14.66 |
| 2002/0065919 | A1 * | 5/2002 | Taylor et al. ................... 709/226 |
| 2003/0083938 | A1 * | 5/2003 | Smith et al. ...................... 705/14 |
| 2004/0098619 | A1 * | 5/2004 | Shay ............................. 713/201 |
| 2004/0186882 | A1 * | 9/2004 | Ting ............................... 709/202 |
| 2005/0165643 | A1 * | 7/2005 | Wilson et al. .................... 705/14 |
| 2008/0109307 | A1 * | 5/2008 | Ullah ............................... 705/14 |
| 2008/0168539 | A1 * | 7/2008 | Stein ............................... 726/5 |
| 2008/0201733 | A1 * | 8/2008 | Ertugrul et al. ................. 725/32 |
| 2008/0220760 | A1 * | 9/2008 | Ullah ........................... 455/420 |
| 2009/0249451 | A1 * | 10/2009 | Su et al. ........................... 726/5 |
| 2010/0063993 | A1 * | 3/2010 | Higgins et al. ............... 709/203 |
| 2010/0088372 | A1 * | 4/2010 | Shridhar et al. ............. 709/204 |
| 2010/0312820 | A1 * | 12/2010 | Goffinet et al. .............. 709/203 |
| 2011/0047072 | A1 * | 2/2011 | Ciurea ........................... 705/39 |

(Continued)

*Primary Examiner* — Morshed Mehedi
*Assistant Examiner* — Sharon Lynch
(74) *Attorney, Agent, or Firm* — Michael A. Springs; Moore & Van Allen PLLC; James C. Edwards

(57) ABSTRACT

Methods, apparatus, systems and computer program products are described and claimed that provide for automatically and positively determining that an associate accessing a business domain/application using an application-specific associate identifier is the same associate that is accessing another business domain/application using another application-specific associate identifier. Once the positive determination of same associate is made, a federated identifier key is generated and applied to all of the platforms in which the associate can be positively identified, so as to globally identify the associates across multiple enterprise-wide domains/applications. As such, the present invention eliminates the need to manually analyze associate data to determine if an associate interfacing with one domain/application is the same associate interfacing with another domain/application.

13 Claims, 6 Drawing Sheets

(56) References Cited

U.S. PATENT DOCUMENTS

| | | | |
|---|---|---|---|
| 2011/0093327 A1* | 4/2011 | Fordyce et al. | 705/14.39 |
| 2011/0276627 A1* | 11/2011 | Blechar et al. | 709/203 |
| 2011/0313847 A1* | 12/2011 | Cao et al. | 705/14.43 |
| 2011/0321156 A1* | 12/2011 | Smith | 726/19 |
| 2012/0109734 A1* | 5/2012 | Fordyce et al. | 705/14.25 |
| 2012/0109882 A1* | 5/2012 | Bouse et al. | 707/607 |
| 2012/0215640 A1* | 8/2012 | Ramer et al. | 705/14.55 |
| 2012/0310829 A1* | 12/2012 | Paulsen et al. | 705/44 |
| 2012/0323694 A1* | 12/2012 | Lita et al. | 705/14.66 |
| 2013/0054701 A1* | 2/2013 | Leeder et al. | 709/205 |
| 2013/0124315 A1* | 5/2013 | Doughty et al. | 705/14.53 |
| 2013/0124324 A1* | 5/2013 | Doughty et al. | 705/14.58 |
| 2013/0124327 A1* | 5/2013 | Doughty et al. | 705/14.64 |
| 2013/0124329 A1* | 5/2013 | Tengler | 705/14.66 |
| 2013/0124331 A1* | 5/2013 | Doughty et al. | 705/14.66 |
| 2013/0124332 A1* | 5/2013 | Doughty et al. | 705/14.66 |
| 2013/0124333 A1* | 5/2013 | Doughty et al. | 705/14.66 |
| 2013/0304661 A1* | 11/2013 | Umamaheswaran et al. | 705/325 |

* cited by examiner

CREATING FEDERATED ASSOCIATE IDENTIFIERS TO POSITIVELY IDENTIFY ASSOCIATES INTERFACING ACROSS MULTIPLE BUSINESS APPLICATIONS

FIELD

In general, embodiments herein disclosed relate to computer data processing and, more specifically automated means for positively identifying associates/employees across multiple domains/applications.

BACKGROUND

Many business entities, such as financial institutions, implement a multitude of business applications and each of the business applications may require that an associate (e.g., employee or the like) log-in as a means of identifying themselves as an authorized user of the business application. However, in many instances the business applications are diverse in nature, such that an associate may log-in into one application or system using one identifier and may log-in to another application using another identifier. Associates having multiple associate identifiers (e.g., user identifiers) are especially prevalent in large corporations such as worldwide enterprises in which the domains and applications are disparate. Further, large corporations have a tendency to merge with other corporations/entities and/or acquire other corporations/entities and, in doing so, assume legacy domains/applications, which, unless modified upon acquisition/merger, provide for associates to identify themselves (i.e., log-in) using legacy domain/application identifiers. For example, in the enterprise-wide financial institution example, an associate may have one identifier in the corporate domain, another identifier in for a loan/mortgage system domain/application, another identifier for an insurance system domain/application, another identifier for a credit card system domain/application and the like.

The use of multiple associate identifiers becomes problematic when trying to determine if an associate accessing one domain/application using one identifier is the same associate accessing another domain/application using another identifier. Such a need to determine associate identity, and moreover determine identity positively, meaning without reasonable doubt, is especially needed in associate activity tracking/monitoring systems which monitor the associates use and/or access to business applications. For example, monitoring of associate activities may be needed to determine if associates are conducting activities that are suspicious and/or outside of the scope of their employment (i.e., unauthorized or illegal activity). Such monitoring of associate activity is a required function of specific entities, such as financial institution or the like. However, if the monitoring system is unable to determine that an associate in one domain/application is the same associate in another domain/application, the resulting monitoring results will invariably be incomplete and inaccurate.

In current practice, much manual intervention is needed to positively identify that an associate accessing one domain/application using a first identifier is the same associate that is accessing a second domain/application using a second identifier. This is because the associate data tied to the associate identifier (i.e., data stored in the associate's system of record (SOR) associated with that particular domain/application) is typically incomplete, outdated, inaccurate and/or otherwise not prone to correlation due to system configurations, data field lengths and the like. As such, analysts must painstakingly analyze data within different systems of record before an associate accessing one domain/application can be positively identified as the same associate accessing another domain/application.

Therefore, a need exists to create an automated system for positively identifying that an associate accessing one domain/application using an application-specific identifier is the same associate that accesses another domain/application using another application-specific identifier. Based on such a determination a world-wide federated identifier may be automatically generated and applied to all domains/application across the enterprise, so as to positively identify the associate regardless of the identifier they use for accessing any one domain/application with the business entity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus, systems and computer program products are described herein that provide for positively identifying an associate having multiple disparate application-specific identifiers for accessing multiple domain/applications within a business entity. Once a determination is made that an associate is the same associate across two domains/applications, similar determinations may be made to identify the associate in most, if not all, other domains/applications. Once the associate has been positively identified across most, if not all, other domains a federated identifier/key may be generated which is applicable to most, if not all, domains/applications within the business entity. The federated identifier/key provides for the associate to be positively identified regardless of which identifier they use to access a domain/application. As such, the present invention circumvents the need for an analyst to manually determine if an associate accessing one domain/application using an application-specific associate identifier is, in fact, the same associate accessing another domain/application using another application-specific associate identifier.

A method for positively identifying business associates accessing multiple business applications within a business using different associate identifiers, defines first embodiments of the invention. The method includes determining that a business associate accessing a first business application using a first application-specific associate identifier is a same associate as an associate accessing a second business application when using a second different application-specific associate identifier. The method further includes generating a different and unique federated identifier for the associate based on the determination that the associate accessing the first business application is the same associate accessing the second business application and storing the federated identifier for the associate in a plurality of systems of record. Each system of record is associated with the associate and a business application implemented by the business.

In specific embodiments the method additionally includes collecting application activity data from a plurality of business applications. Each application activity datum indicates that an associate has accessed one of a plurality of business applications and includes an application-specific associate identifier associated with the associate and used to access the business application. In such embodiments of the method, the application-specific associate identifiers in the application activity data may be the impetus (i.e., forms a basis) for determining that the associate accessing the first business application is the same associate interfacing with the second business platform.

In further specific embodiments of the method, determining further includes identifying linking data that links the first application-specific associate identifier and the second application-specific associate identifier and accessing one or more systems of record associated with the business applications based on the linking data to determine that that the associate accessing the first business application is the same associate accessing the second business application.

In still further specific embodiments of the method, determining includes accessing a first and second system of record associated, respectively, with the first and second business applications based on the first and second application-specific associate identifiers. The first system of record includes first data items associated with the associate and the second system of record includes second data items associated with the associate. Additionally, determining includes identifying one or more data item matches between the first data items in the first system of record and the second data items in the second system of record, wherein the data item matches include same or similar data. In such embodiments the method further includes applying a weighting factor to each of the one or more data item matches. The weighting factor is based on similarity of the data and a significance that the data item match may indicate that the associate accessing the first business application is the same associate accessing the second business application. Further, such embodiments of the method may include calculating the weighted one or more data item matches and comparing a calculated total for the weighted one or more data item matches to a predetermined threshold to determine if the associate accessing the first business application is the same associate accessing the second business application.

In still other specific embodiments the method includes implementing the federated identifier to access the plurality of systems of record to determine a plurality of application-specific associate identifiers associated with the associate. In such embodiments the method may include identifying instances of the associate accessing business applications based on the determined plurality of application-specific associate identifiers.

An apparatus for positively identifying associates accessing multiple business applications within a business using different associate identifiers provides for second embodiments of the invention. The apparatus includes a computing platform including one or more processors and a memory in communication with the processor. The apparatus further includes an associate federation module stored in the memory and executable by at least one of the processors. The associate federation module is configured to determine that an associate accessing a first business application using a first application-specific associate identifier is the same associate as an associate accessing a second business application when using a second different application-specific associate identifier and, based on the determination, generate a different and unique federated identifier for the associate. In addition, the apparatus includes a plurality of systems of record stored in memory, such that each system of record is associated with the associate and with a business application implemented by the business and configured to receive and store the federated identifier.

In specific embodiments the apparatus further includes an application activity monitoring module stored in the memory, executable by the processor and configured to monitor and collect application activity data from a plurality of business applications. Each application activity datum indicates that an associate has accessed one of a plurality of business application and includes an application defined associate identifier associated with the associate and used to access the business application. In such embodiments of the apparatus, the application activity data collected by the application activity monitoring module may be the impetus for determining that the associate accessing the first business application is the same associate accessing the second business application.

In other specific embodiments of the apparatus the associate federation module is further configured to identify linking data that links the first application-specific associate identifier and the second application-specific associate identifier and access one or more systems of record associated with a business application based on the linking data to determine that that the associate interfacing with the first business application is the same associate accessing the second business application.

Moreover, in other specific embodiments, the associate federation module is further configured to access a first and second system of record associated, respectively, with the first and second business applications based on the first and second application-specific identifiers. The first system of record includes first data items associated with the associate and the second system of record includes second data items associated with the associate. The module is further configured to identify one or more data item matches between the first data items in the first system of record and the second data items in the second system of record, such that data item matches include same or similar data. In related embodiments of the apparatus, the associate federation module is further configured to apply a weighting factor to each of the one or more data item matches. The weighting factor is based on similarity of the data and a significance that the data item match may indicate that the associate accessing the first business application is the same associate accessing the second business application. In addition, the associate federation module is further configured to calculate the weighted one or more data item matches and compare a calculated total for the weighted one or more data item matches to a predetermined threshold to determine if the associate accessing the first business application is the same associate accessing the second business application.

In additional specific embodiments the apparatus includes an associate access determining module stored in the memory, executable by the processor and configured to implement the federated identifier to access the plurality of systems of record to determine a plurality of application-specific associate identifiers associated with the associate. In such embodiments of the apparatus, the associate access determining module may be further configured to identify business associates that have previously accessed a business application based on the determined plurality of application-specific associate identifiers.

A computer program product including a non-transitory computer-readable medium, defines third embodiments of the invention. The medium includes a first set of codes for causing a computer to determine that an associate accessing a first business application using a first application-specific associate identifier is the same associate as an associate accessing a second business application when using a second different application-specific associate identifier. The medium additionally includes a second set of codes for causing a computer to generate a different and unique federated identifier for the associate based on the determination that the associate accessing the first business application is the same associate accessing the second business application. In addition, the medium includes a third set of codes for causing a computer to store the federated identifier for the associate in a plurality of systems of record. Each system of record is associated with the associate and a business application implemented by the business.

Thus, embodiments of the invention are described in greater detail below that provide for positively determining that an associate accessing a business domain/application using an application-specific associate identifier is the same associate that is accessing another business domain/application when using another different application-specific associate identifier. Once the positive determination of same associate is made, a federated identifier key is generated and applied to all of the platforms in which the associate can be positively identified, so as to globally identify the associates across multiple enterprise-wide domains/applications. As such, the present invention eliminates the labor-intensive need to manually analyze associate data to determine if an associate accessing one domain/application is the same associate accessing another domain/application.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
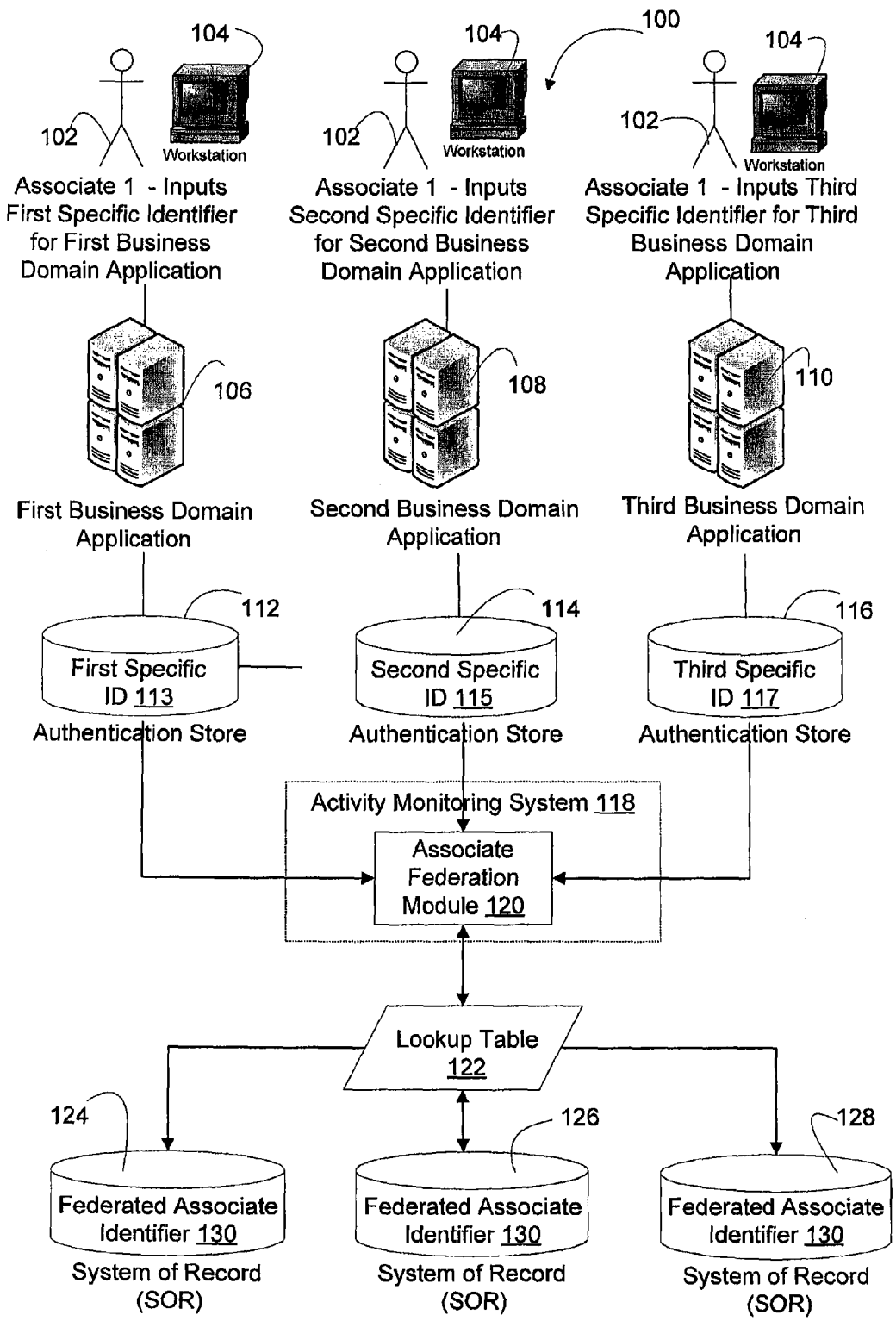
Figure 2:
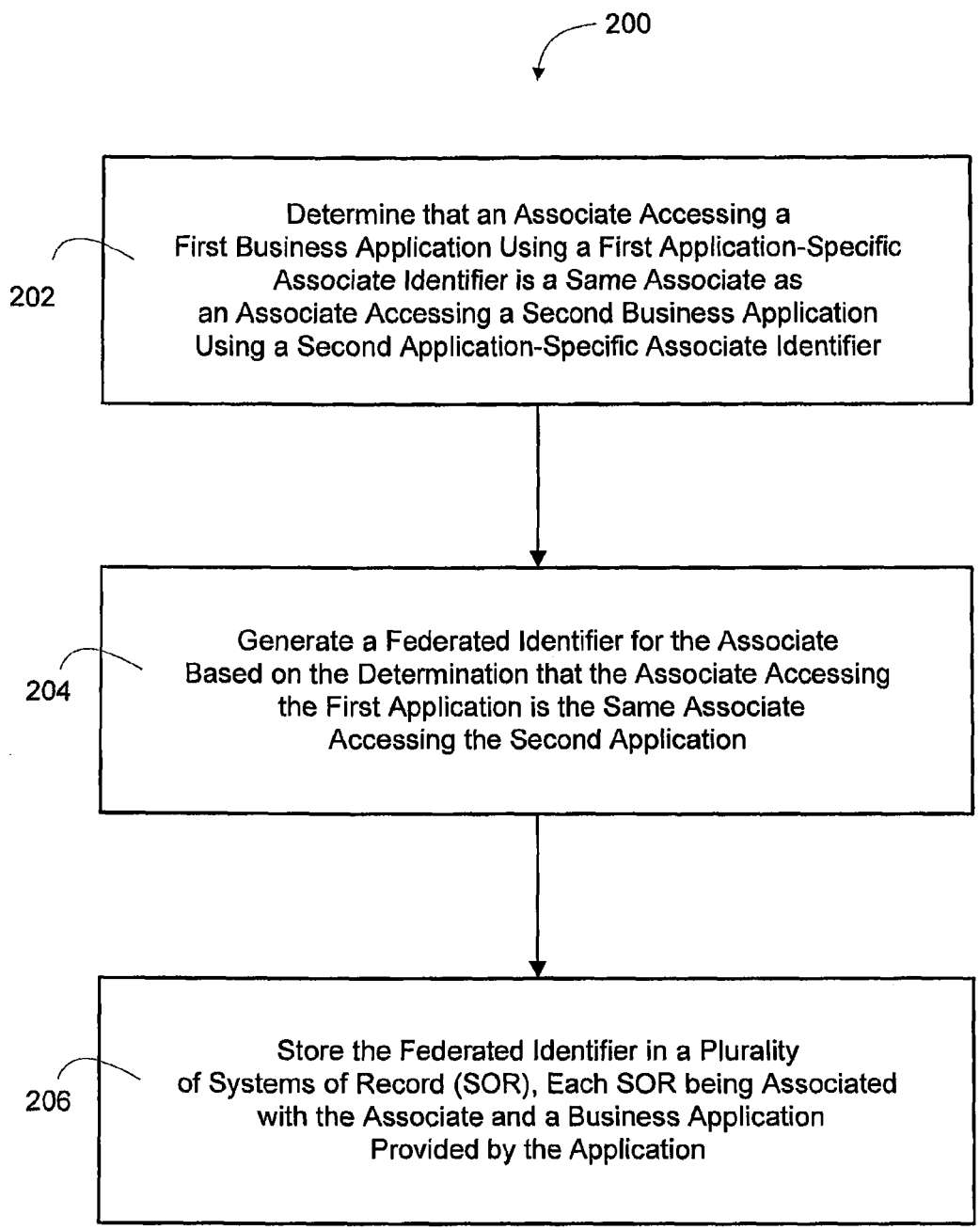
Figure 3:
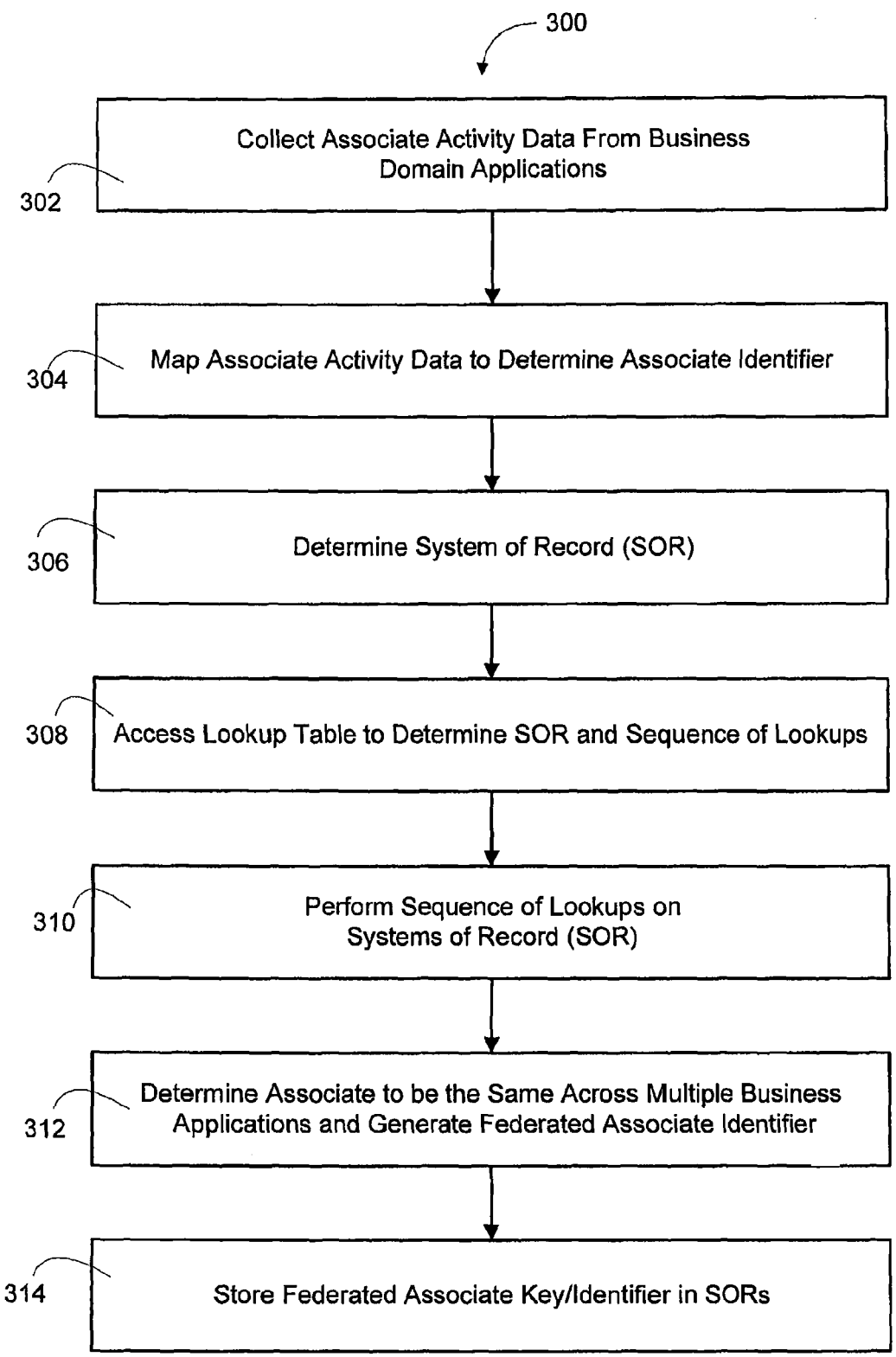
Figure 4:
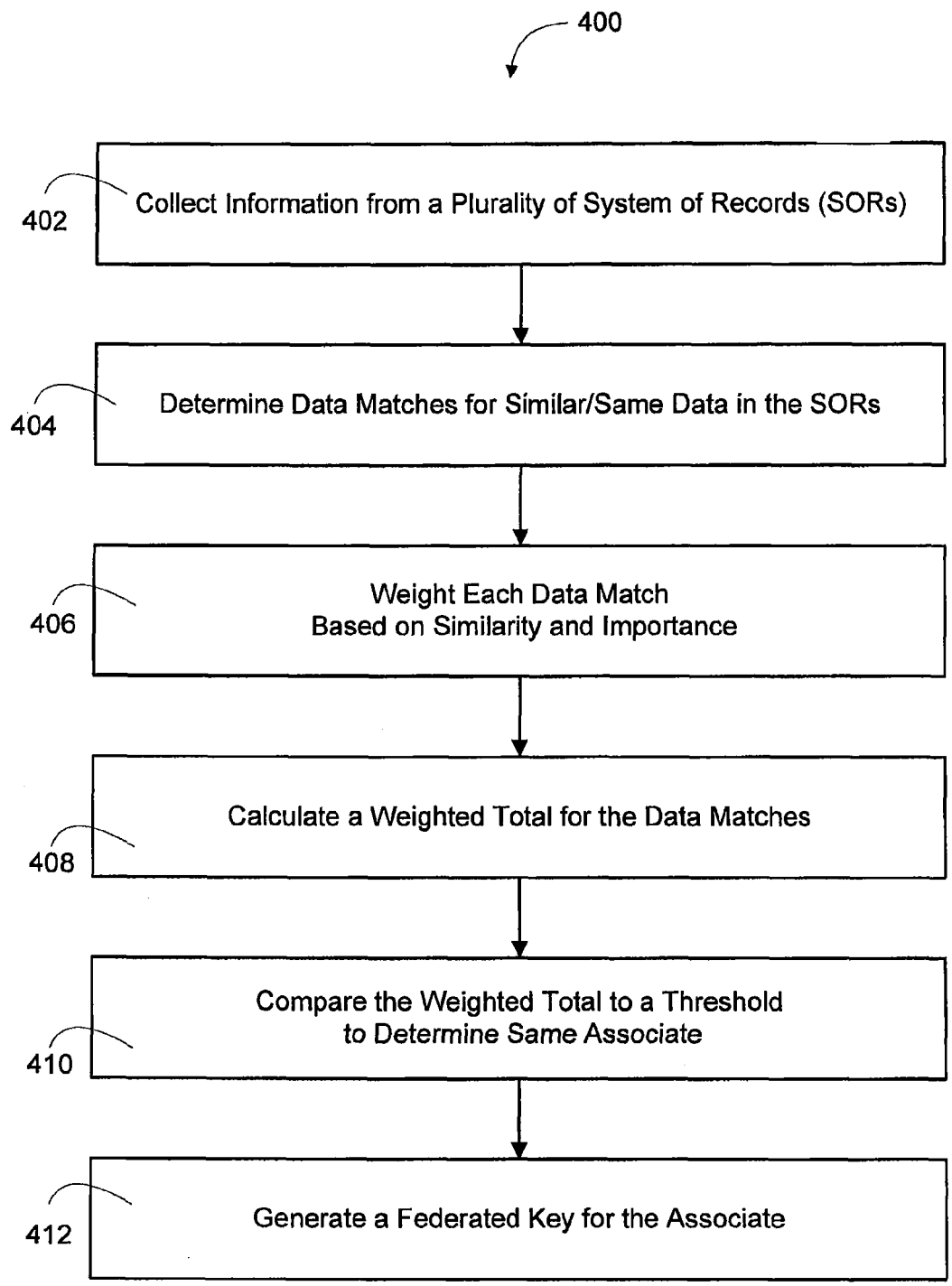
Figure 5:
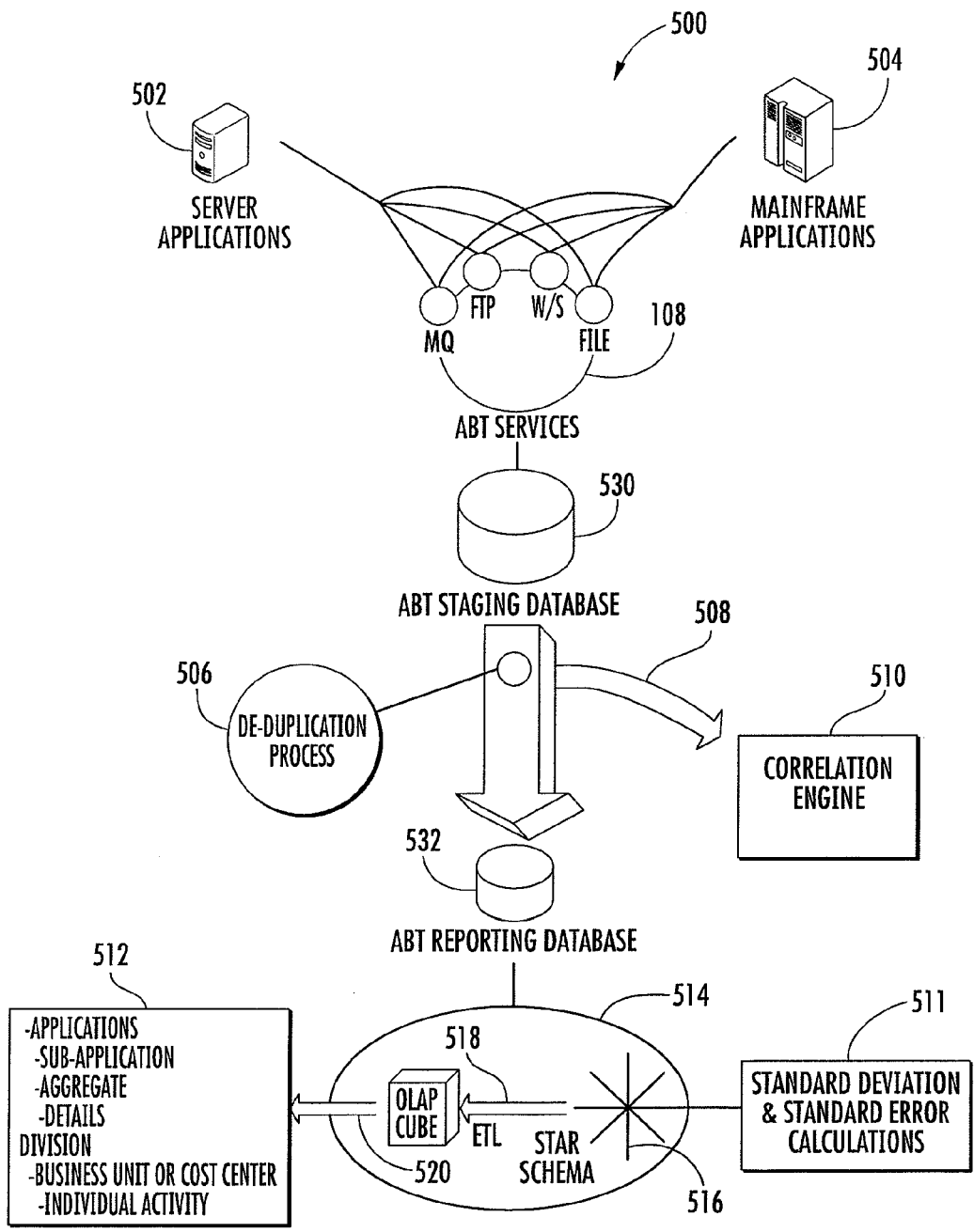
Figure 6:
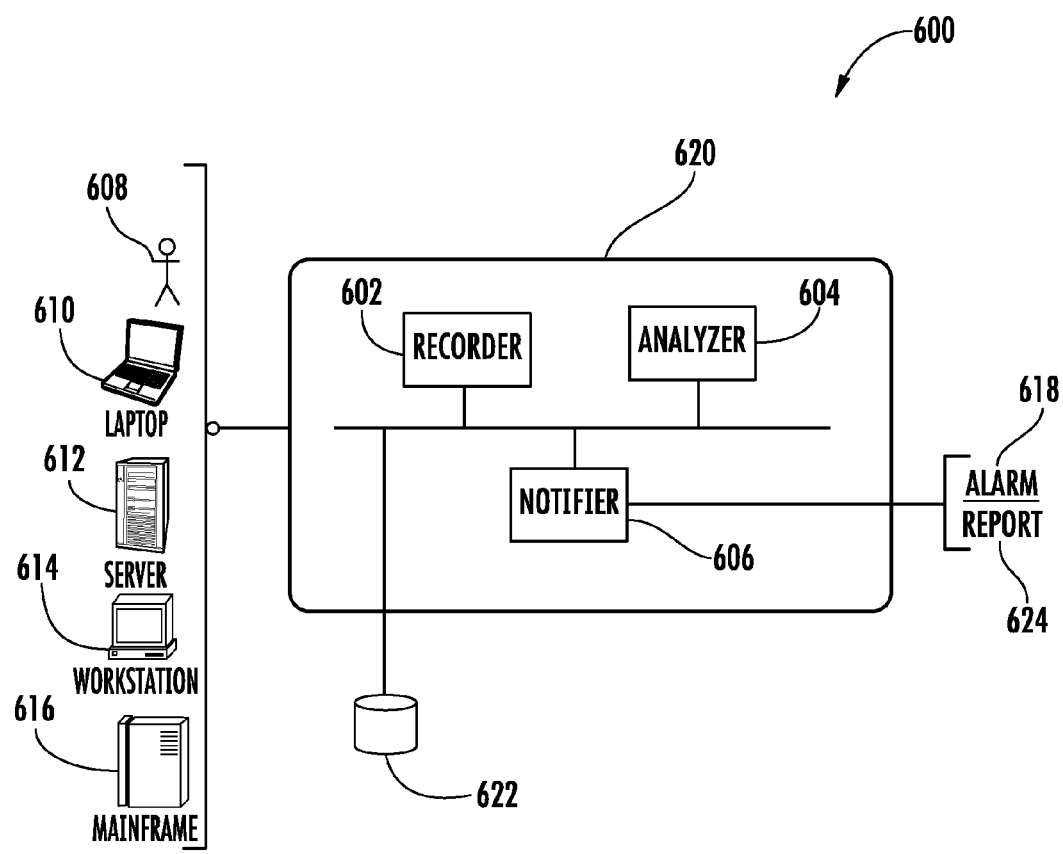

Having thus described embodiments of the invention in general terms, reference will now be made to the accompanying drawings, which are not necessarily drawn to scale, and wherein:

FIG. 1 is a block diagram of a system for positive identification of an associate in an activity monitoring system, in accordance with embodiments of the present invention;

FIG. 2 is a method for positively identifying an associate accessing different domains/application with different associate identifiers, in accordance with embodiments of the present invention;

FIG. 3 is a method for generating federated associate identifiers, in accordance with embodiments of the present invention;

FIG. 4 is a method for determining that an associate accessing a first application with a first application-specific associate identifier is the same associate accessing a second application with a second application-specific associate identifier, in accordance with embodiments of the present invention;

FIG. 5 is schematic block diagram that illustrates architecture of a system for monitoring application-related and/or platform-related activity in a distributed computing network, in accordance with embodiments of the present invention; and FIG. 6 is a schematic diagram showing general operation of a system for monitoring application-related activity in a distributed computing network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, apparatus, systems, and computer program products are described herein that provide for positively identifying an associate that accesses a business domain/application using an application-specific associate identifier and accesses another domain/application using another different application-specific associate identifier. Based on the same associate determination a different and unique federated associate identifier is generated and is applied to all other domains/applications in which the associate is positively identified. The federated identifier/key provides for the associate to be positively identified regardless of which identifier they use to access a domain/application. As such, the present invention eliminates the need for an analyst to manually determine if an associate accessing one domain/application using an application-specific associate identifier is, in fact, the same associate accessing another domain/application using another application-specific associate identifier.

Referring to FIG. 1, a system 100 is depicted for associate identity federation within a business entity, in accordance with embodiment of the present invention. An associate 102 executes, via workstation 104, various business domain applications, such as first business domain application 106, second business domain application 108 and third business domain application 110. It should be noted that workstation 104 is not necessarily one specific workstation and, as such, may include multiple different workstations 104 or combinations of workstations 104. As such, the associate 102 may execute/access first business domain application 106, second business domain application 108 and third business domain application 110 all from one specific workstation 104, or execute/access each application from a different workstation 104 or one or more of the applications using a combination of two or more workstations 104. Each of the business domain applications requires input of an associate identifier to authenticate the associate 102 and provide the associate access to the application. Thus, first business domain application 106 is in communication with authentication store 112 which stores first application-specific identifier 113, second business domain application 108 is in communication with authentication store 114 which stores second application-specific associate identifier 115 and third business domain application 108 is in communication with authentication store 116 which stores third application-specific identifier 117.

According to embodiments of the present invention the associate identifiers may be specific or otherwise tied to the business domain application, such that the associate 102 may have many different associate identifiers which provide access to one or more associated applications. For example, in a financial institution scenario, the first business domain application 106 may reside within a corporate domain and the associated associate identifier 113 may be an employee number. The second business domain application 108 may be within a credit card domain and the associated associate identifier 115 may be a condensed version of the associate's name, while the third application 110 may be within a loan/mortgage domain and the associated associate identifier 117 may be another number/identifier or another form of the associate's name. The use of different associate identifiers within the business entity is typically due to many factors, such as the size of the enterprise, the number and variance in configuration of the applications existing in the business entity, legacy domains/applications acquired through mergers/acquisitions and the like.

System 100 may additionally include activity monitoring system 118, which is configured to monitor associate activity as it pertains to the various business applications. Monitoring of associate activity may be necessary to track the activities which an associate participates in and identify any activities which may be considered suspicious. An exemplary activity monitoring system 118 is described in more detail in relation to FIGS. 5 and 6. Activity monitoring system 118 may include associate federation module 120 which is configured to determine that an associate accessing a business domain application with a first application-specific associate identifier is, in fact, the same associate that is accessing the business domain application with a second application-specific associate identifier and generate a corresponding federated associate identifier 130 that is capable of positively identifying the associate across most, and in some embodiments all, of the business applications implemented by the business entity. While the associate federation module 120 is shown and described as being included within the activity monitoring system it should be noted that the associate federation module 120 may exist as a stand-alone module and be implemented in any instances in which a need exists to determine that an associate accessing a business domain application with a first application-specific associate identifier is, in fact, the same associate that is accessing the business domain application with a second application-specific associate identifier and generate a corresponding federated associate identifier.

In specific embodiments of the system 100 the activity monitoring system 118 collects activity-related data from the business applications, such as first, second and third business domain applications 106, 108 and 110 and the like. The associate federation module 120 may be configured to map the activity-related data for a given business application to determine the associated application-specific identifier. The associate federation module 120 may further be configured to identify and isolate the application-specific identifier(s). Once the application-specific identifier(s) has been identified, the associate federation module 120 may be configured to determine the systems of record (SORs) associated with the application-specific identifier(s), such as system of record (SOR) 124 associated with first business domain application 106, system of record (SOR) 126 associated with second business domain application 108 and system of record (SOR) 128 associated with third business domain application 110. In specific embodiments, the associate federation module 120 may determine the SOR(s) and sequence of lookups by accessing the optional lookup table 122.

Once the SOR(s) have been determined, the associate federation module 120 may further be configured to perform a sequence of lookups on the SORs. Further, the associate federation module 120 may be configured based on the lookup and algorithmic and/or heuristic computation positively determine that the an associate accessing a business domain application with a first application-specific associate identifier is, in fact, the same associate that is accessing the business domain application with a second application-specific associate identifier. Once the determination of same associate has been made, a federated associate identifier 130 may be generated and applied (i.e., stored) to the various SORs associated with associated and the business applications in which the associate has been or can be positively identified. In specific embodiments of the invention, the federated associate identifier 130 may be applied to all of the SORs associated with the associate and all of the business applications implemented by the business entity. In this regard, the federated associate identifier 130 serves as a universal identifier that can positively identify an associate across a global enterprise.

Referring to FIG. 2 a flow diagram of a method 200 for positively identifying positively business associates accessing multiple business applications within a business using different associate identifiers, in accordance with embodiments of the present invention. At Event 202, a determination is made by a computing device processor that an associate accessing a first business application using a first application-specific associate identifier is the same associate as an associate accessing a second business application using a second application-specific associate identifier. For example, in the financial institution scenario, the associate may access an application in the corporate domain using their person/employee number and access an application in the credit card domain using a condensed form of their name.

The actual positive identification that an associate accessing a first business application using a first application-specific associate identifier is the same associate as an associate accessing a second business application using a second application-specific associate identifier may occur using any combination of algorithmic or heuristic computations. In one specific example, linking data is identified that links the first application-specific associate identifier and the second application-specific associate identifier. The linking data may be identified in the systems of record (SORs) of the first and second business applications, in a lookup table or elsewhere. Based on the linking data, one or more other systems of record (SORs) associated with other business applications are identified to positively identify the associate across the various business applications implemented by the business entity.

In another specific example, the systems of record (SORs) associated with the first and second business applications are accessed based on the associated first and second application-specific associate identifiers. Data matches are identifying between the data items in the first system of record and the data items in the second system of record. The data matches include the same or similar data. For example, an address or telephone number with one different numeral or the like. Once the data matches have been determined, a weighting factor may be applied to the data items matches, such that the weighting factor applied to a data match is based on the degree of similarity of the data and a significance that that the data item match may indicate that the associate accessing the first business application is the same associate accessing the second business application. The weighted data matches are subsequently totaled and compared to a predetermined threshold value to determine if the associate accessing the first business application is the same associate accessing the second business application.

At Event 204 a federated associate identifier is generated for the associate based on the determination that the associate accessing the first application is the same associate accessing the second application. At Event 206 the federated associate identifier is stored in most, and in some instances all, of the systems of records associated with the associate and various business applications implemented by the business entity. It should be noted that application of the federated identifier to the various system of records (i.e., storing the identifier in the various system of record (SORs)) requires that a determination be made that the associate is the same associate in each of the systems of records. Such a determination may occur prior to generating the federated associate identifier or, in alternate embodiments, after the federated identifier has been generated.

In optional embodiments the method may include collecting application activity data from a plurality of business applications. Each application activity datum indicates that an associate has accessed one of a plurality of business applications and may include an application-specific associate identifier associated with the associate and used to access the business application. In such embodiments of the method, the application-specific associate identifiers in the application activity data may be the impetus for determining that the associate accessing the first business application is the same associate accessing the second business application.

In still other optional embodiments the method may include implementing the federated identifier to access the plurality of systems of record to determine a plurality of application-specific associate identifiers associated with the associate and identify instances of the associate accessing business applications based on the determined plurality of application-specific associate identifiers.

Turning the reader's attention to FIG. 3 a flow diagram is presented of a method 300 for a method for generating federated associate identifiers, in accordance with embodiments if the present invention. At Event 302, associate activity data is collected from a plurality of business applications and, at Event 304, the associate activity data is mapped to determine the application-specific associate identifier pertaining to the associate activity event.

At Event 306, once the application-specific associate identifier has been identified and isolated, the associated system of record (SOR) is determined. At Event 308, a lookup table may be accessed to determine the system of record and the sequence of lookups required. At Event 310, the sequence of lookups in the SOR is performed.

At Event 312, algorithmic and/or heuristic computations are performed to determine that the associate accessing one business application using a first application identifier is, in fact, the same associate accessing another application using a second associate identifier. In addition determinations are made that the associate is the same associate in most, if not all, of the other business applications being monitored (i.e., from which activity data is collected). Once the determinations have been made, a federated associate identifier, otherwise referred to as a federated associate key, is generated for the associate.

At Event 314, the federated associate key is stored in most, and in some instances all, of the systems of record (SORs) that are associated with the associate and relate to business applications implemented by the business entity.

Referring to FIG. 4 a flow diagram is depicted of a method 400 generating a federated associate identifier, in accordance with embodiments of the present invention. At Event 402, information is collected from a plurality of systems of record, each system of record being associated with the associate and related to a business application. At Event 404, data matches are determined for same or similar data in the systems of record. Heuristics may be implemented to determine data matches for data that is similar but not the same.

At Event 406, each data match is weighted based on the similarity of the data comprising the match and the importance of the data in determining that the associate is the same associate. For example, a social security match would be highly significant in terms of positively identifying an associate, while an address or phone number may be less significant in terms of positively identifying an associate.

At Event 408, a total is calculated for the weighted data matches and, at Event 410, the weighted total of the data matches is compared to a predetermined threshold. If the weighted total meets or exceeds the threshold the associate is deemed to be the same associate that accessed one business application using a first associate identifier and accessed another business application using second associate identifier. At Event 412, based on the weighted total meeting or exceeding the predetermined threshold, a federated identifier/key is generated for the associate.

FIG. 5 is a schematic block diagram that illustrates architecture of a system 500 according to an exemplary embodiment of the present invention for monitoring application-related and/or platform-related activity in a distributed computing network. For example, employees/associates can perform application-related activities, such as accessing secure data using a Web interface via server 502. Other employees/associates can perform application-related activities, such as accessing secure data via a mainframe 504. For example, in the financial institution example, an associate/employee or the like can access an application to request loan history information via a mainframe 504. On the other hand, an associate/employee or the like can perform an application-related activity using a server 502, for example, using a Web site or any software application interacting with the server 502 accessing secure data. Thus, the application being executed at server 502 and/or mainframe 504 are monitored by activity monitoring module 118 through services such as Message Queuing (MQ), File Transfer Protocol (FTP), Web Services (W/S), file or the like, interacting with the activity monitoring staging database 530. The activity monitoring module 118 is configured to, among other functions, receive monitored activity data, parse the content of the data, apply business rules to the data, calculate hash values, and insert data into activity monitoring staging database 530, where the data may be persisted to disk at any step in case of system failure.

In accordance with the present invention each application may require that the associate/employee use an identifier, such as a user ID or the like to gain access to the application. Each of the applications requires that the associate enter an application-specific identifier, the application-specific identifier may be defined by the associate at the initial access or the application may be preconfigured to accept a specified associate identifier (e.g., employee number or the like). It should be noted that while the associate identifiers are deemed to be application-specific the same associate identifier may apply to more than one domain/application. For example, in the financial institution example, an associate may use an employee/person number as the associate identifier to access application in the corporate domain and may use a condensed form of their name as the associate identifier to access applications in the credit card and/or loan/mortgage domains.

In another example, customers can perform platform-related activities, such as performing online banking activities Web interface via server 502. Other employees/associates can perform platform-related activities, such interfacing with data via a mainframe 404. For example, in the financial institution example, a customer can access a platform application to request loan history information via a mainframe 504. Thus, the platform being accessed through server 502 and/or mainframe 504 are monitored by activity monitoring module 118 through services such as Message Queuing (MQ), File Transfer Protocol (FTP), Web Services (W/S), file or the like, interacting with the activity monitoring staging database 530. The activity monitoring module 118 is configured to, among other functions, receive monitored activity data, parse the content of the data, apply business rules to the data, calculate hash values, and insert data into activity monitoring staging database 530, where the data may be persisted to disk at any step in case of system failure.

Thereafter, data from the activity monitoring staging database 530 is processed and transferred to the activity monitoring reporting databases 532. The processing and transfer may include detecting for duplication processing 506 where duplicative information is flagged or deleted, and correlation 508 of rules for activities based upon events (using, for example, a correlation engine 510). According to exemplary implementations, additional processing can be performed upon storing in the activity monitoring reporting databases 532, including, but not limited to, determining activity outliers, statistical calculations for standard deviation and standard error 511 and providing reports 512 for application and business units 514, wherein detail access information is stored 516, information is aggregated into an OLAP (OnLine Analytical Process) cube 418, and finally the aggregated data and statistically calculated information is provided for reporting, cross-tabulation, and automated alerting 520.

FIG. 6 is a diagram showing general operation of a system for monitoring application-related activity and platform-related in a distributed computing network 600, according to an exemplary embodiment of the present invention.

As shown in FIG. 6 an exemplary system 620 monitors application-related activity and platform-related activity, such as access by associates to specified secure data and performance of specified activities and interfacing by customers with business platforms in a distributed computing network 600, the system 620 includes a recorder 602 for recording information indicative of the occurrence of an application-related activity such as access to specified application-related data or performance of specified activities for a plurality employees/associates 608 performing the activities via one of the exemplary systems 610-616, such as laptop 610, server 612, workstation 614 and/or mainframe 616. In addition, recording information indicative of the occurrence of a platform-related activity such as interfacing by a customer with a business platform via one of the exemplary systems 610-616, such as laptop 610, server 612, workstation 614 and/or mainframe 616. The system provides a storage unit 622 for retaining monitored occurrences of application-related activities and/or platform-related activities and an analyzer 604 for analyzing the application-related activity and/or platform-related activities. Further, the system may include a notifier 610 for generating a real-time notification/alarm 618 and/or historical report(s) 612.

Thus, methods, apparatus, systems and computer program products described above provide for positively determining that an associate accessing a business domain/application using an application-specific associate identifier is the same associate that is accessing another business domain/application using another application-specific associate identifier. Once the positive determination of same associate is made, a federated identifier key is generated and applied to all of the platforms in which the associate can be positively identified, so as to globally identify the associates across multiple enterprise-wide domains/applications. As such, the present invention eliminates the need to manually analyze associate data to determine if an associate interfacing with one domain/application is the same associate interfacing with another domain/application.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for positively identifying business associates accessing multiple business applications within a business using different associate identifiers, the method comprising:
    determining, via a computing device processor, that an associate of the business accessing a first business application using a first application-specific associate identifier is the same associate as the associate accessing a second business application when using a second different application-specific associate identifier, wherein the determination includes,
        accessing a first system of record associated with the first business application based on the first application-specific associate identifier, wherein the first system of record includes first data items associated with the associate,
        accessing a second system of record associated with the second business application based on the second application-specific associate identifier, wherein the second system of record includes second data items associated with the associate,
        identifying one or more data item matches between the first data items in the first system of record and the second data items in the second system of record, wherein data item matches include same or similar data,
        applying a weighting factor to each of the one or more data item matches, wherein the weighting factor is based on similarity of the data and a significance that the data item match may indicate that the associate accessing the first business application is the same as the associate accessing the second business application,
        calculating a total for the weighted one or more data item matches and comparing the calculated total to a predetermined threshold to determine if the associate accessing the first business application is the same as the associate accessing the second business application;
    generating, via a computing device processor, a different and unique federated identifier for the associate based on the determination that the associate accessing the first business application is the same as the associate accessing the second business application;
    implementing the federated identifier to access the plurality of systems of record to determine a plurality of application-specific associate identifiers associated with the associate and identifying associates of the business that have previously accessed a business application based on the determined plurality of application-specific identifiers, and
    storing, in computing device memory, the federated identifier for the associate in a plurality of systems of record, wherein each system of record is associated with the associate and with a business application implemented by the business.

2. The method of claim 1, further comprising collecting, at a computing device, application activity data from a plurality of business applications, wherein each application activity datum indicates that an associate has accessed one of a plurality of business applications and includes an application-specific associate identifier used by the associate to gain access to the business application.

3. The method of claim 2, wherein the application-specific associate identifiers in the application activity data is an impetus for determining that the associate accessing the first business application is the same as the associate interfacing with the second business platform.

4. The method of claim 1, wherein determining further comprises:
    identifying, via a computing device processor, linking data that links the first application-specific associate identifier and the second application-specific associate identifier;
    accessing, via a computing device processor, one or more systems of record associated with business applications based on the linking data to determine that the associate accessing the first business application is the same as the associate accessing the second business application.

5. The method of claim 1, further comprising identifying, via a computing device processor, instances of the associate accessing business applications based on the determined plurality of application-specific associate identifiers.

6. An apparatus for positively identifying associates accessing multiple business applications within a business using different associate identifiers, the apparatus comprising:
    a computing platform including one or more processors and a memory in communication with the processor;
    an associate federation module stored in the memory, executable by at least one of the processors and configured to:
        determine that an associate accessing a first business application using a first application-specific associate identifier is the same as the associate accessing a second business application when using a second different application-specific associate identifier by:
        accessing a first and second system of record associated, respectively, with the first and second business applications based on the first and second application-specific identifiers, wherein the first system of record includes first data items associated with the associate and the second system of record includes second data items associated with the associate,
        identifying one or more data item matches between the first data items in the first system of record and the second data items in the second system of record, wherein data item matches include same or similar data,
        applying a weighting factor to each of the one or more data item matches, wherein the weighting factor is based on similarity of the data and a significance that the data item match may indicate that the associate accessing the first business application is the same as the associate accessing the second business application, calculating a total for the weighted one or more data item matches and comparing the calculated total to a predetermined threshold to determine if the associate accessing the first business application is the same as the associate accessing the second business application, and based on the determination, generate a different and unique federated identifier for the associate and a plurality of systems of record stored in the memory, where each system of record is associated with the associate and with a business application implemented by the business and configured to receive and store the federated identifier, and further comprising an associate access determining module stored in the memory, executable by the processor and configured to implement the federated identifier to access the plurality of systems of record to determine a plurality of application-specific associate identifiers associated with the associate, wherein the associate access determining module is further configured to identify associates of the business that have previously accessed a business application based on the determined plurality of application-specific associate identifiers.

7. The apparatus of claim 6, further comprising an application activity monitoring module stored in the memory, executable by the processor and configured to monitor and collect application activity data from a plurality of business applications, wherein each application activity datum indicates that an associate has accessed one of a plurality of business application and includes an application-defined associate identifier that is associated with the associate and used by the associate to access the business application.

8. The apparatus of claim 7, wherein the application activity data collected by the application activity monitoring module is an impetus for determining that the associate accessing the first business application is the same as the associate accessing the second business application.

9. The apparatus of claim 6, wherein associate federation module is further configured to identify linking data that links the first application-specific associate identifier and the second application-specific associate identifier and access one or more systems of record associated with business application based on the linking data to determine that the associate interfacing with the first business application is the same as the associate accessing the second business application.

10. A computer program product including a non-transitory computer readable medium, the medium comprising:

a first set of codes for causing a computer to determine that an associate accessing a first business application using a first application-specific associate identifier is the same associate as the associate accessing a second business application when using a second different application-specific associate identifier by (1) accessing a first and second system of record associated, respectively, with the first and second business applications based on the first and second application-specific associate identifier, wherein the first system of record includes first data items associated with the associate and the second system of record includes second data items associated with the associate, (2) identifying one or more data item matches between the first data items in the first system of record and the second data items in the second system of record, wherein data item matches include same or similar data, (3) applying a weighting factor to each of the one or more data item matches, wherein the weighting factor is based on similarity of the data and a significance that the data item match may indicate that the associate accessing the first business application is the same as the associate accessing the second business application, and (4) calculating a total for the weighted one or more data item matches and comparing a calculated total for the weighted one or more data item matches to a predetermined threshold to determine if the associate accessing the first business application is the same as the associate accessing the second business application;

a second set of codes for causing a computer to generate a different and unique federated identifier for the associate based on the determination that the associate accessing the first business application is the same as the associate accessing the second business application;

a third set of codes for causing a computer to store the federated identifier for the associate in a plurality of systems of record, wherein each system of record is associated with the associate and with a business application implemented by the business, a fourth set of codes for causing a computer to implement the federated identifier to access the plurality of systems of record to determine a plurality of application-specific associate identifiers associated with the associate, and a fifth set of codes for causing a computer to identify business associates of the business that have previously accessed a business-application based on the determined plurality of application-specific associate identifiers.

11. The computer program product of claim 10, further comprising a fourth set of instructions for causing a computer to collect associate activity data from a plurality of business applications, wherein each associate activity datum indicates that an associate has accessed one of the plurality of business applications and includes an application-specific associate identifier that is associated with the associate and used by the associate to access the application.

12. The computer program product of claim 11, wherein the application specific associate identifiers in the associate activity data collected by the fourth set of instructions is an impetus for the first set of instructions to determine that the associate accessing the first business application is the same as the associate interfacing with the second business application.

13. The computer program product of claim 10, wherein the first set of codes are further configured to cause the computer to identify linking data that links the first application-specific associate identifier and the second application-specific associate identifier and access one or more systems of record associated with business applications based on the linking data to determine that the associate accessing the first business application is the same as the associate accessing the second business application.

* * * * *